May 7, 1929.  A. MEISSNER  1,712,046

FREQUENCY MULTIPLIER

Filed Feb. 26, 1924

BRUSH DISCHARGE DEVICE

Inventor
ALEXANDER MEISSNER
By his Attorney

Patented May 7, 1929.

1,712,046

UNITED STATES PATENT OFFICE.

ALEXANDER MEISSNER, OF BERLIN, GERMANY, ASSIGNOR TO GESELLSCHAFT FÜR DRAHTLOSE TELEGRAPHIE M. B. H., OF BERLIN, GERMANY, A CORPORATION OF GERMANY.

FREQUENCY MULTIPLIER.

Application filed February 26, 1924, Serial No. 695,165, and in Germany April 20, 1923.

My invention relates to arrangements for deriving a current of a higher frequency from a source of a given lower frequency.

An object of the invention is to derive a higher frequency from a sine wave of given frequency by means of a suitable brush discharge device, the higher frequency being a higher harmonic of the sine wave frequency.

Other objects will be apparent from the following description when taken into consideration with the accompanying drawing, in which.

Figure 1:
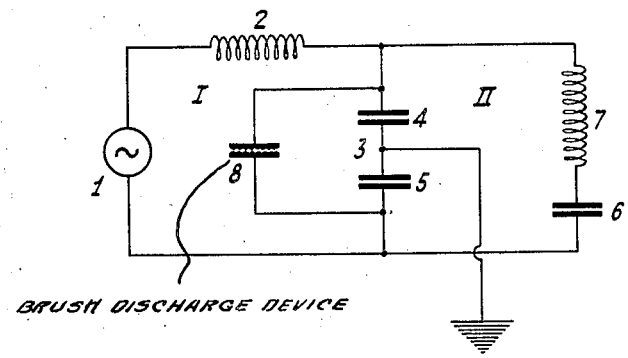
Fig. 1 shows a schematic connection embodying the invention.

A radio frequency generator 1, a self-inductance 2 and a capacitance 3 composed of condensers 4 and 5 form a circuit I tuned to the generator frequency. The electric brush discharge device 8 consisting of points or thin wires is connected in parallel to 3. Circuit II consisting of condensers 3 and 6 and inductance 7 is tuned to the desired harmonic and so dimensioned that it does not considerably disturb the syntony of circuit I.

Figure 2:
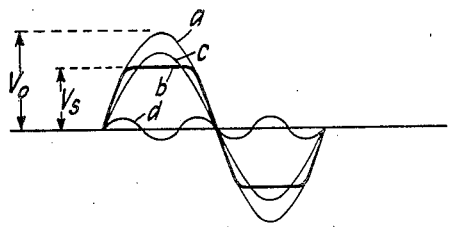
Fig. 2 shows some curves, explaining the operation of the invention.

If now the generator voltage is so much increased that the voltage across 3 exceeds the voltage $V_a$ necessary to cause a brush discharge in the discharge device 8, the voltage curve assumes the truncated shape $b$ instead of the sine-shape $a$ (Figure 2), the wave $a$ representing the voltage that would be obtained across the condenser 3 if the discharge device 8 were not present. Such a curve, as is well known, can be analyzed into the fundamental $c$ and one harmonic $d$, or more, of a ratio of amplitudes which depends on the ratio of the discharging voltage $V_a$ to the voltage $V_0$ which would be attained if no brush discharge occurred. Useful energy of the frequency of the respective harmonic is obtained from this system by resonance by means of the secondary circuit II.

The advantage of this method is above all, the great simplicity of the frequency multiplying device, and the absence of iron, for iron always requires an expensive cooling arrangement in the case of larger transmitters. Here the energy losses, which always accompany frequency multiplying, occur in the air and are carried away by simple air-cooling.

As shown in Fig. 1 the circuit may be grounded, and yet be symmetrical, by grounding at a point between condensers 4 and 5.

It will be appreciated that my invention is not limited to the embodiments described above, but that I am entitled to all modifications thereof as fairly come within the scope of the following claims.

Having described my invention I claim:

1. An arrangement for multiplying frequency comprising a source of alternating current, a circuit tuned to the frequency of, and coupled to, said source, a second circuit tuned to a harmonic of said source, brush discharge means common to both circuits for deforming the wave from said source so that the said harmonic is obtained in the second tuned circuit.

2. A frequency multiplier comprising a first circuit tuned to a lower frequency and including a capacitance, a second circuit coupled to the first circuit and tuned to a higher frequency which is a harmonic of the lower frequency, and means common to said circuits for producing the harmonic from the lower frequency comprising the aforesaid capacitance and a brush discharge gap connected in parallel therewith.

3. A frequency multiplier comprising a circuit containing a source of alternating current, a second circuit tuned to a harmonic of the source frequency, a brush discharge gap common to the two circuits, for deforming the source wave so that harmonics thereof can be resonated out by the tuned circuit.

4. A frequency multiplier comprising a source of fundamental frequency, a circuit tuned to a harmonic thereof, and a harmonic generator including a brush discharge device adjusted to discharge at a potential less than the maximum potential of the energy of fundamental frequency.

ALEXANDER MEISSNER.